United States Patent [19]

Ohi et al.

[11] Patent Number: 5,760,512
[45] Date of Patent: Jun. 2, 1998

[54] BRUSHLESS MOTOR

[75] Inventors: Shinichi Ohi; Fuhito Umegaki, both of Konan, Japan

[73] Assignee: Zexel Corporation, Tokyo, Japan

[21] Appl. No.: 490,993

[22] Filed: Jun. 15, 1995

[30] Foreign Application Priority Data

Jun. 16, 1994 [JP] Japan .................. 6-157986
Jun. 23, 1994 [JP] Japan .................. 6-164606

[51] Int. Cl.$^6$ .................. H02K 7/14; H02K 11/00
[52] U.S. Cl. .................. 310/91; 310/89; 310/258; 310/67 R
[58] Field of Search .................. 310/51, 89, 91, 310/258, 67 R

[56] References Cited

U.S. PATENT DOCUMENTS

| | | | |
|---|---|---|---|
| 3,858,067 | 12/1974 | Otto | 310/42 |
| 4,012,654 | 3/1977 | Starcevic | 310/258 |
| 4,249,097 | 2/1981 | Gronholm | 310/51 |
| 4,536,671 | 8/1985 | Miller | 310/258 |
| 4,801,831 | 1/1989 | Lewis | 310/91 |
| 4,894,574 | 1/1990 | Ragaly | 310/258 |
| 4,965,476 | 10/1990 | Lin | 310/51 |
| 4,975,613 | 12/1990 | Brem et al. | 310/258 |
| 5,117,140 | 5/1992 | Sargeant et al. | 310/91 |
| 5,264,748 | 11/1993 | Ootsuka et al. | 310/90 |
| 5,334,895 | 8/1994 | Morioka et al. | 310/67 R |
| 5,363,003 | 11/1994 | Harada et al. | 310/67 R |
| 5,442,249 | 8/1995 | Zimmerman | 310/91 |
| 5,475,275 | 12/1995 | Dohogne et al. | 310/89 |
| 5,545,937 | 8/1996 | Dunfield et al. | 310/90.5 |
| 5,623,382 | 4/1997 | Moritan et al. | 360/99.08 |

Primary Examiner—Steven L. Stephan
Assistant Examiner—Michael J. Wallace, Jr.
Attorney, Agent, or Firm—Wenderoth, Lind & Ponack

[57] ABSTRACT

A brushless motor includes features that prevent jolting or shaking of a rotating shaft by urging the rotating shaft in one direction and have a simple construction and can heighten the mechanical strength of a portion holding the rotating shaft in order to lower noise. The brushless motor having a rotor having magnets and a rotating shaft, a stator for generating a rotating magnetic field with respect to the rotor, an exciting coil wound on the stator for receiving electrical power and for generating the magnetic field, and a holding plate including a magnetic member mounted in a position facing permanent magnets of the rotor. Accordingly, jolting or shaking of the rotating shaft can be prevented by urging the rotor and the rotating shaft toward the holding plate in order to attract the holding plate by the magnetic power of the magnets due to mounting the holding plate in a position facing the magnets of the rotor.

16 Claims, 6 Drawing Sheets

BRUSHLESS MOTOR

BACKGROUND OF THE INVENTION

1. Field of the invention

The present invention relates to a brushless motor used in a blower of an air conditioner for an automobile.

2. Description of the related art

A brushless motor used in an air conditioner for an automobile, for example, is disclosed in Japanese Unexamined Patent Publication 4-42750. The brushless motor is provided with a rotating shaft which is rotatably held by a bearing of a cover cylinder extending upwardly from a housing case. A rotor is constituted by, an umbrella-like yoke which is disposed with the upper end of the rotating shaft, and a plurality of magnets which are mounted on the inner periphery of an outer portion of the yoke.

A stator is provided with a stator core disposed with the cover cylinder and extending radially from the center portion to a position opposing the magnet, and an exciting coil wound on the stator core.

In the brushless motor as described above, a sirocco-type fan is mechanically connected to the rotating shaft, and the rotor is rotated by a rotation magnetic field generated in the stator to rotate the sirocco-type fan.

However, the brushless motor has problems in that noise occurs due to jolting or shaking of the shaft because of the small clearance between the bearing and the rotating shaft, and damage to the bearing can occur.

As a way preventing jolting or shaking of the shaft, the rotating shaft can be urged in the radial direction by an elastic member such as a spring (see Japanese Unexamined Utility Model Publication No. 61-114960), or the rotating shaft may be urged in the radial direction by an elastic member and the rotation of the rotating shaft is absorbed by the elastic member (see Japanese Unexamined Utility Model Publication No. 62-123657). Alternatively, a convex portion of a side-pressing spring, inserted in a frame, can elastically contact a plate receiving side-pressure in the upper end of the rotor to press the shaft to the bearing in one direction (see Japanese Unexamined Patent Publication No. 5-153755).

However, in these references, an urging means such as a spring or an elastic member contacts the rotating shaft to urge the rotating shaft in one direction, and thus, a problem exists in that the rotating resistance of the rotating shaft is large and a large power loss occurs, and a problem exists in that many extra parts or extra structure are needed.

Furthermore, because the cover cylinder holding the rotating shaft is secured on a printed circuit board by screws, the sound of fluttering and vibration of flutter of the fan are transmitted through the rotating shaft, the bearing and the cover cylinder to the printed circuit board, and the sound or the vibration is leaked from the housing case.

SUMMARY OF THE INVENTION

An object of the present invention is to offer a brushless motor that prevents jolting or shaking of a rotating shaft by urging the rotating shaft in one direction with a simple construction which can increase the mechanical strength of the portion holding the rotating shaft in order to lower noise.

The present invention, therefore, is a brushless motor including a rotor having magnets and a rotating shaft, a stator for generating a rotating magnetic field with respect to the rotor, an exciting coil wound on the stator for receiving electrical power and for generating said magnetic field, and a holding plate having a magnetic member mounted in a position facing the magnets mounted on the rotor.

Accordingly, the present invention can prevent jolting or shaking of the rotating shaft by urging the rotor and the rotating shaft to the holding plate in order to attract the holding plate by the magnetic power of the magnets due to mounting the holding plate which includes a magnetic member in a position facing the magnets mounted in the rotor.

In the present invention, one side of the holding plate is allocated more area in close proximity to the permanent magnets, and the other side less area. A part of the holding plate includes a non-magnetic material, or the holding plate is disposed so as to not be perpendicular to an axis of rotation of the rotating shaft.

Accordingly, the present invention can prevent jolting or shaking of the rotating shaft because the holding plate is slanted, that is, the surface of the plate is not perpendicular to the axis of rotation of the shaft in order to be able to urge the rotating shaft in one direction without contacting the rotating shaft.

Further, in the present invention, the holding plate is formed by a core holder which secures the stator to the housing case.

Thus, the above effects can be accomplished by a simple construction by forming the holding plate with a core holder securing the stator to the housing case.

Furthermore, in the present invention, the stator has an isolation cover secured to the stator core. The isolation cover is mounted in a position facing the rotor and has securing legs extending from the isolation cover and secured to the housing case.

Accordingly, because a securing shaft in which the rotating shaft is rotatably accommodated, is secured to the housing case by the isolation cover due to securing by the securing legs extending from the isolation cover securing the stator to the housing case, the mechanical strength of the portion holding the rotating shaft may be heightened.

BRIEF DESCRIPTION OF THE DRAWINGS

The above and other features of the present invention and the concomitant advantages will be better understood and appreciated by persons skilled in the field to which the invention pertains in view of the following description which is provided in conjunction with the accompanying drawings which illustrate preferred embodiments. In the drawings.

DETAILED DESCRIPTION OF THE PREFERRED EMBODIMENTS

In the following, the embodiments of the present invention are described with reference to the drawings.

Figure 1:
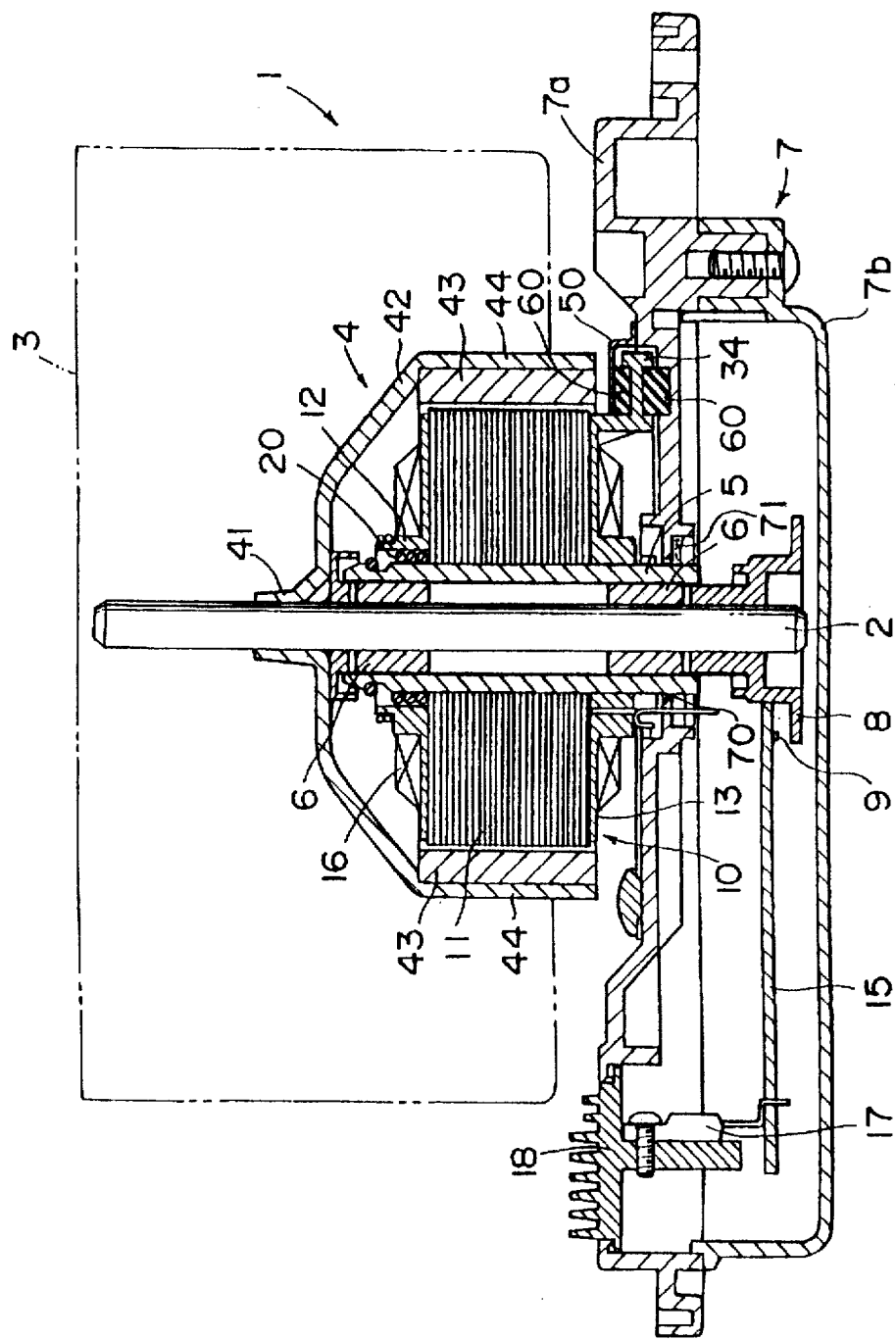
FIG. 1 is a section view illustrating a configuration of a brushless motor of an embodiment of the present invention.

A brushless motor 1 shown in FIG. 1 is used, for example, as a blower of an air conditioner for an automobile. A sirocco-type fan 3 is secured on the upper end of a rotating shaft 2, and a rotor 4 is secured at a position adjacent to and down relative to the position where the fan 3 is secured.

The rotor 4 includes a yoke 42 which is provided with a boss portion 41, secured to the rotating shaft 2, and a cylindrical portion 44 expanding from the boss portion 41 and having an umbrella-shape and an outer peripheral portion which is formed with a cylinder-shape. Permanent magnets 43 are mounted in an inner peripheral surface of the cylindrical portion 44 in such a manner that their respective circumferential polarities are the same. The yoke 42 is formed with a magnetic member to restrain leakage magnetic flux of the permanent magnets 43. A ring-shape permanent magnet 8 is secured an the lower end of the rotating shaft 2, and hall elements 9, disposed on a printed circuit board, detect the magnetic pole position of the permanent magnet 8 to thereby effect a detection of the magnetic pole corresponding to the positions of the magnetic pole of the permanent magnets 43.

The stator 10 includes a stator core 11, an exciting coil 16 and upper and lower isolation covers 12 and 13. The stator is formed with iron cores formed by multilayering, for example, silicon-steel plates. The upper and lower isolation covers 12 and 13 isolate the stator core 11 from the exciting coil 16 wound on the stator 10 and hold the stator core 11. The stator 10 is disposed on a securing shaft 5 secured on a housing case 7 (7a, 7b) of a printed circuit substrate 15. The stator 10 is urged downwardly by a securing spring 20 and secured by the securing shaft 5. The rotating shaft 2 is inserted in the securing shaft 5 and rotatably holds a bearing 6 mounted in the inner peripheral portion of the securing shaft 5.

An exciting circuit (not shown in the drawing figures) for exciting the stator 10 is formed on the printed circuit substrate 15, wherein specific numbers of hall elements 9 mounted on the print substrate 15 detect the position of the permanent magnet 8 disposed on the rotating shaft 2. An electric current is supplied alternatively in turn with a specific phase difference with respect to the exciting coil 16 in each phase of the stator 10 based on the detected signal thereby, generating a rotating magnetic field.

In FIG. 1, element 17 is a power field effect transistor (FET), and element 18 is a radiation plate heat sink for the FET.

Figure 2:
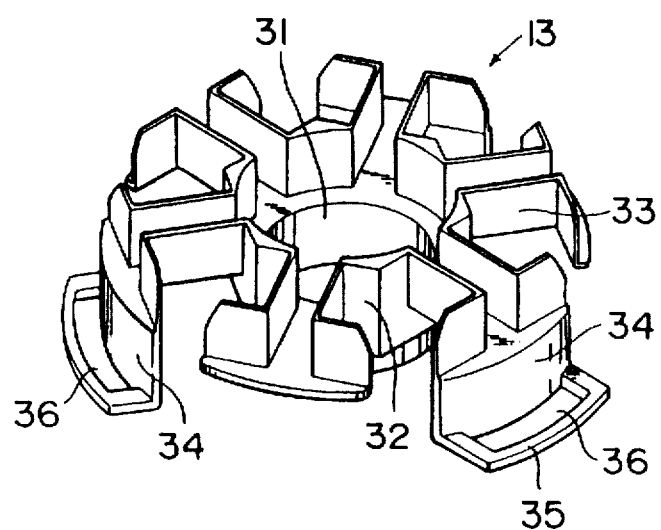
FIG. 2 is a perspective view of an isolation cover of the embodiment of the present invention.
Figure 3A:
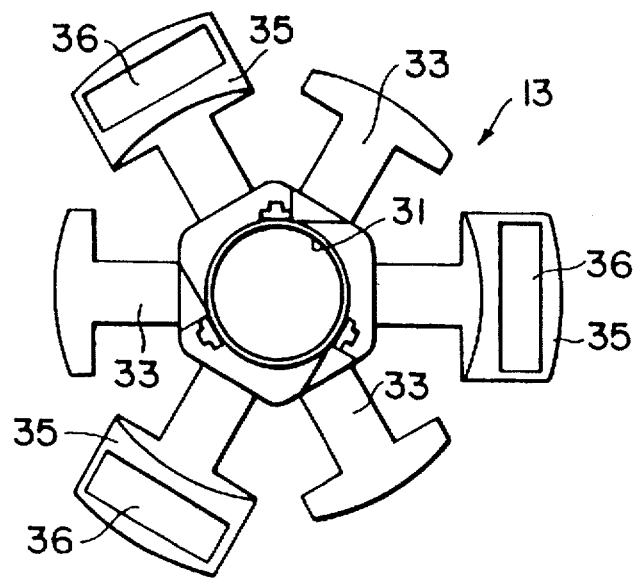
FIG. 3A is a plan view of the isolation cover of the embodiment of the present invention.
Figure 3B:
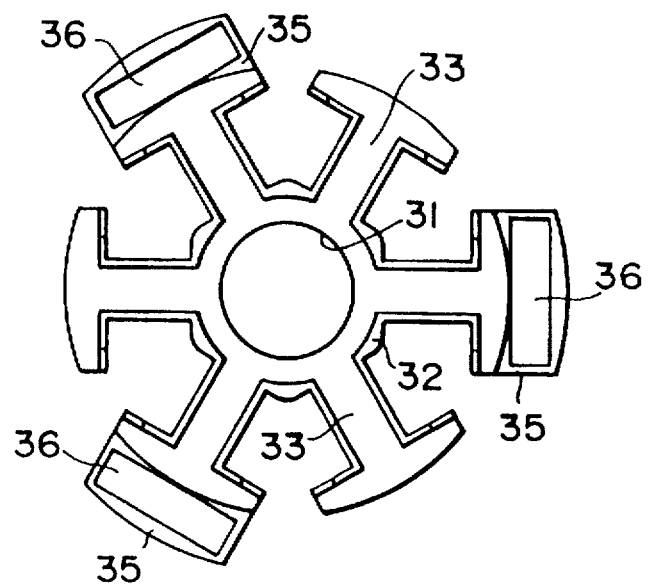
FIG. 3B is a bottom view of the isolation cover.

The isolation cover 13 has, as shown in FIGS. 2, 3A and 3B, a peripheral wall 32 including a central hole 31 which the securing shaft 5 is inserted and secured in and side surfaces mounted around the central hole 31, a stator core accommodating portion 33 including accommodating walls extending radially from the side surfaces, and L-shaped securing legs 34 extending from specific positions of the stator core accommodating portions 33. Mounting grooves 36 in which buffer members 60 are mounted in, are formed in upper and lower surfaces of the securing portions 35 which extend radially from axially extending portions of the securing legs 34. In this embodiment, the securing legs 34 are formed in three stator core accommodating portions 33 positioned alternately of six stator core accommodating portions 33, but the number of side surfaces, the number of the stator core accommodating portions 33 extending from the side surfaces, and the number of the stator core accommodating portions 33 which securing legs 34 are formed may vary.

Furthermore, the stator 10 is formed such that the stator core 11 is disposed within the isolation cover 13, wherein the exciting coil 16 is wound and is secured by the securing shaft 5. The buffer members 60 formed by elastic members, for example, natural rubber, synthetic rubber, plastic or synthetic resin and so on, are attached to the mounting grooves 36 formed on the securing portions 35 of the securing legs 34 extending from the isolation cover 13. The buffer members 60 are secured by being disposed between a core holder 50 and the housing case 7.

Figure 4:
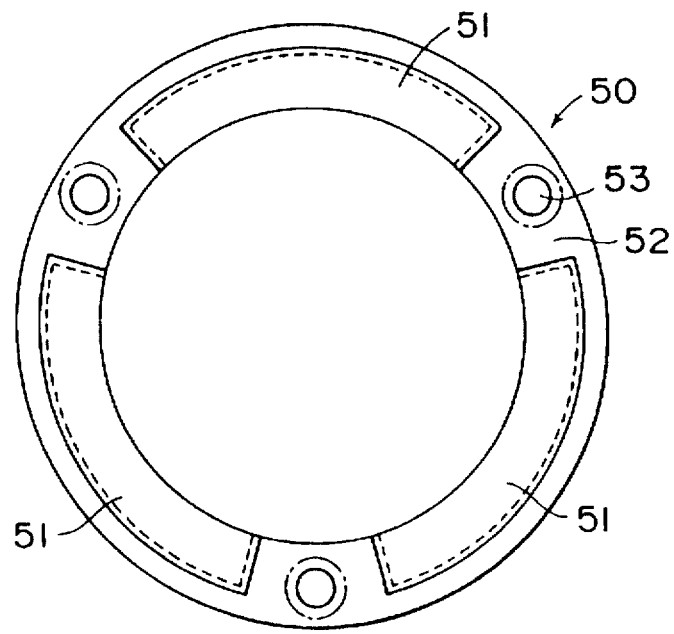
FIG. 4 is a plan view of a core holder used as a holding plate in a first embodiment of the present invention.

The core holder 50 is used as a holding plate in the first embodiment of the present invention. The core holder is as shown in FIG. 4, formed annularly with a magnetic member of, for example, an iron plate and so on, having a convex portion 51 securing the securing portion 35 of the isolation cover 13 via the buffer member 60 and a concave portion 52 formed with a hole 53 for securing the core holder 50 to the housing case 7. In the core holder 50 of the first embodiment shown in FIG. 4, the convex portion 51 extending to the position facing the permanent magnets 43 is made as large as possible, increasing the magnetic attraction by the permanent magnets 43. Thus, the magnetic force urges the rotating shaft 2 to the side of the housing case in the axial direction, and jolting or shaking of the rotating shaft 2 due to the small clearance between the rotating shaft 2 and the bearing 6 can be prevented. In the core holder as shown in FIG. 5, convex portions 51a and 51b are formed large enough to secure the securing portion 35.

Figure 5:
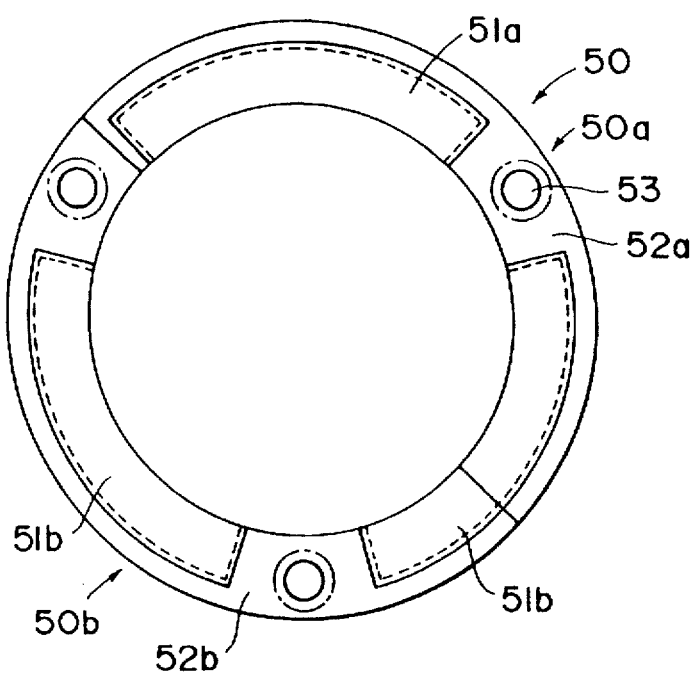
FIG. 5 is a plan view of a core holder used as a holding plate in a second embodiment of the present invention.
Figure 8:
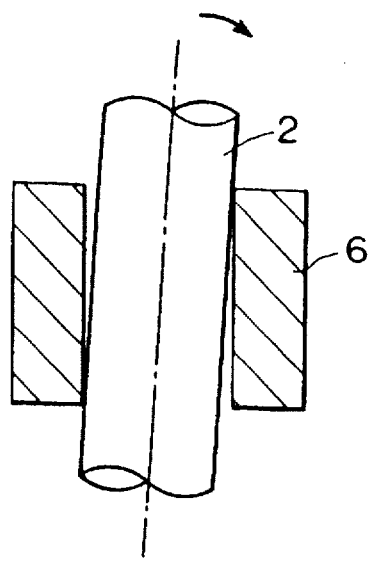
FIG. 8 is a view illustrating the relationship between a rotating shaft and a bearing when side-pressure is applied.

A core holder 50 used as a holding plate of the second embodiment as shown in FIG. 5 is constituted by a half circular arc member 50a formed of a magnetic material such as an iron plate, and a half circular arc member 50b formed of a non-magnetic material such as a synthetic resin or a plastic material. In this embodiment, the permanent magnets 43 are pulled to the side of the half circular arc member 50a formed by a magnetic material and are not pulled to the side of the half circular arc member 50b formed of a non-magnetic material. The rotating shaft 2 is urged to the side with a side moment as shown in FIG. 8, and jolting or shaking of the rotation shaft 2 may be prevented effectively by urging the rotating shaft 2 to one side of the bearing 6.

Figure 6:
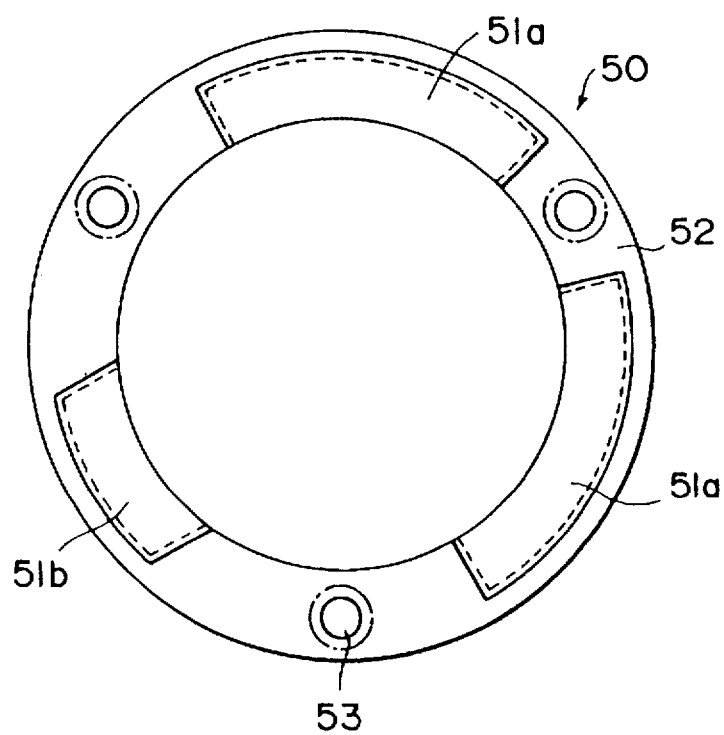
FIG. 6 is a plan view of a core holder used as a holding plate in a third embodiment of the present invention.

In the third embodiment shown in FIG. 6, jolting or shaking of the rotating shaft 2 may be prevented by urging the rotating shaft 2 with the side moment as well as in the second embodiment. In the third embodiment, a core holder 50 used as the holding plate has one side of the convex portion 51a which is made large and secures the securing portion 35 of the isolation cover 13, and has another side of the convex portion 51b which is made small and secures the securing portion 35 of the isolation cover 13. Thus, the attraction of the permanent magnets 43 is different between one side and another side of the convex portions 51a and 51b, and the same effects as that of the second embodiment are obtained.

Figure 7:
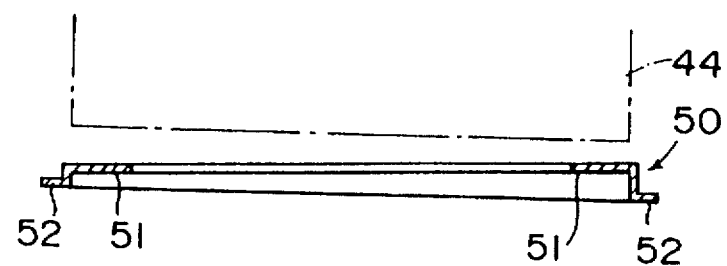
FIG. 7 is a plan view of a core holder used as a holding plate in a fourth embodiment of the present invention.

In the fourth embodiment as shown in FIG. 7, the surface of the core holder facing the permanent magnets 43 is slanted, that is, the plane of the surface is not perpendicular to the axis of rotation of the rotating shaft. Thus, the side pressing force, with respect to the rotating shaft due to the attraction of the permanent magnets 43, is stronger on the one side of the core holder 50 which is nearer the permanent magnets 43 as compared to the side of the core holder 50 which is farther from the permanent magnets 43.

Further, it is preferred that a seal formed by a non-magnetic material is covered with a part of the surface of the core holder 50 formed by a magnetic material used as the holding plate, or a seal formed by a magnetic material is covered with a part of the surface of the core holder 50 formed by a non-magnetic material to make attraction by the permanent magnet 43 of the rotor 2 variable for urging the rotating shaft 2 with the side moment.

As described above, in the present invention, the holding plate formed by a magnetic material is disposed with a portion facing the permanent magnets of the rotor. The rotation shaft is urged downwardly in the axial direction due to attraction between the permanent magnets and the holding plate, and thus jolting or shaking of the rotating shaft due to the small clearance between the rotating shaft and the bearing can be prevented.

By one side of the holding plate being formed of a magnetic material and another side of the holding plate being formed of a non-magnetic material, by the amount of the convex portion being made variable, or by the holding plate being slanted, the direction of urging power applied to the rotating shaft is made variable and the rotating shaft is urged in one direction with the side moment, thereby ensuring that jolting or shaking of the rotating shaft can be prevented. Since the rotating shaft is urged in one direction without contacting other members, the loss of power in the rotating shaft can be prevented.

As described above, by the stator core and the isolation cover secured with the stator core being mounted on the securing shaft holding rotatably the rotating shaft which the fan is attached to, and by securing legs extending from the isolation cover being secured to the housing case, the mechanical strength of the securing shaft is increased and transfer of vibration causing noise can be prevented.

What is claimed is:

1. A brushless motor comprising:

a housing case;

a stator mounted on said housing case;

an exciting coil wound on said stator for generating a rotating magnetic field;

a rotary shaft rotatable mounted in said stator so as to extend through said stator;

a rotor mounted on said rotary shaft and positioned so as to cover said stator, said rotor having permanent magnets which are disposed radially outwardly of said stator and are circumferentially spaced with respect to a central axis of said rotary shaft, each of said permanent magnets having first and second ends which are spaced along said central axis; and a holding plate secured to said housing case and located adjacent to said first ends of said permanent magnets, said holding plate comprising magnetic material, wherein said holding plate is an annular member and is provided with portions which protrude toward said permanent magnets, and said portions are not uniformly distributed on said holding plate relative to a longitudinal axis of said rotary shaft.

2. The brushless motor as claimed in claim 1, wherein said holding plate comprises a core holder which secures said stator to said housing case.

3. A brushless motor comprising:

a housing case;

a stator mounted on said housing case;

an exciting coil wound on said stator for generating a rotating magnetic field;

a rotary shaft extending through said stator, said rotary shaft being mounted in said stator so as to be rotatable relative to said stator;

a rotor mounted on said rotary shaft and positioned so as to cover said stator, said rotor having permanent magnets which are disposed radially outwardly of said stator and are circumferentially spaced with respect to a central axis of said rotary shaft, each of said permanent magnets having first and second ends which are spaced along said central axis; and a holding plate secured to said housing case and located adjacent to said first ends of said permanent magnets, said holding Plate comprising non-magnetic material located on one half of said holding plate and magnetic material located on the other half of said holding plate.

4. The brushless motor as claimed in claim 3, wherein said holding plate comprises a core holder which secures said stator to said housing case.

5. A brushless motor comprising:

a housing case;

a stator mounted on said housing case;

an exciting coil wound on said stator for generating a rotating magnetic field;

a rotary shaft extending through said stator, said rotary shaft being mounted in said stator so as to be rotatable relative to said stator;

a rotary mounted on said rotary shaft and positioned so as to cover said stator, said rotor having permanent magnets which are disposed radially outwardly of said stator and are circumferentially spaced with respect to a central axis of said rotary shaft, each of said permanent magnets having first and second ends which are spaced along said central axis; and a holding plate located adjacent said first ends of said permanent magnets, said holding plate comprising non-magnetic material located on one half of said holding plate and magnetic material located on the other half of said holding plate wherein said holding plate has a surface which faces said first ends of said permanent magnets, and said surface is slanted, relative to said rotary shaft, such that said surface does not lie in a plane which is perpendicular to said central axis of said rotary shaft.

6. The brushless motor as claimed in claim 5, wherein said holding plate comprises a core holder which secures said stator to said housing case.

7. A brushless motor comprising:

a housing case;

a stator mounted on said housing case, said stator including a stator core and an isolation cover provided with securing legs, wherein said stator core is disposed within said isolation cover and said securing leas engage said housing case so as to secure said stator core to said housing case;

an exciting coil wound on said stator for generating a rotating magnetic field;

a rotary shaft extending through said stator, said rotary shaft being mounted in said stator so as to be rotatable relative to said stator; and a rotor mounted on said rotary shaft and covering said stator, said rotor including permanent magnets which are mounted so as to oppose said stator core.

8. The brushless motor as claimed in claim 7, further comprising:

a securing shaft inserted through a central hole in said isolation cover, wherein said stator is disposed on said securing shaft and said rotary shaft is rotatably disposed in said securing shaft; and a spring engaging said securing shaft and a surface of said stator so as to urge said stator toward said isolation cover which is disposed on an opposite side of said stator relative to said spring.

9. The brushless motor as claimed in claim 7, further comprising a holding plate including a magnetic material, wherein each of said permanent magnets has a first and second end, and said holding plate is located adjacent to said first ends of said permanent magnets, wherein said securing legs are positioned between said holding plate and said housing case.

10. The brushless motor as claimed in claim 9, wherein said holding plate comprises a stator core holder.

11. The brushless motor as claimed in claim 9, wherein said holding plate includes portions which protrude axially toward said permanent magnets, and said portions are not uniformly distributed on said holding plate relative to a longitudinal axis of said rotary shaft.

12. The brushless motor as claimed in claim 11, wherein said holding plate comprises a stator core holder.

13. The brushless motor as claimed in claim 9, wherein said holding plate includes non-magnetic material which is disposed on one of a plurality of sections of said holding plate.

14. The brushless motor as claimed in claim 13, wherein said holding plate comprises a stator core holder.

15. The brushless motor as claimed in claim 9, wherein said holding plate is disposed about said rotary shaft and has a surface which faces said first ends of said permanent magnets, and said surface is slanted so that said surface does not lie in a plane which is perpendicular to said central axis of said rotary shaft.

16. The brushless motor as claimed in claim 15, wherein said holding plate comprises a stator core holder.

* * * * *

UNITED STATES PATENT AND TRADEMARK OFFICE
CERTIFICATE OF CORRECTION

PATENT NO. : 5,760,512
DATED : June 2, 1998
INVENTOR(S) : Shinichi Ohi, et al.

It is certified that error appears in the above-indentified patent and that said Letters Patent is hereby corrected as shown below:

In Claim 3, at column 6, line 13, change "Plate" to --plate--.

In Claim 7, at column 6, line 52, change "leas" to --legs--.

Signed and Sealed this

Eighth Day of September, 1998

Attest:

BRUCE LEHMAN

Attesting Officer  Commissioner of Patents and Trademarks